United States Patent [19]

Strefling

[11] Patent Number: 5,676,418
[45] Date of Patent: Oct. 14, 1997

[54] WINDOW SHROUD FOR PASSENGER VAN

[75] Inventor: Richard W. Strefling, Elkhart, Ind.

[73] Assignee: Glaval Corporation, Elkhart, Ind.

[21] Appl. No.: 552,001

[22] Filed: Nov. 2, 1995

[51] Int. Cl.[6] ........................ B60J 1/20
[52] U.S. Cl. ............ 296/180.1; 296/154; 52/97
[58] Field of Search ........................ 296/152, 154, 296/180.1, 217; 52/97

[56] References Cited

U.S. PATENT DOCUMENTS

| 4,810,025 | 3/1989 | Riley | 296/154 X |
|---|---|---|---|
| 5,251,953 | 10/1993 | Willey | 296/154 X |
| 5,253,829 | 10/1993 | Willey | 296/217 |
| 5,460,425 | 10/1995 | Stephens | 296/154 X |

FOREIGN PATENT DOCUMENTS

| 157641 | 8/1953 | Australia | 296/154 |
| 164758 | 9/1953 | Australia | 296/154 |
| 216087 | 2/1957 | Australia | 296/154 |
| 2063951 | 6/1981 | United Kingdom | 52/97 |

*Primary Examiner*—Dennis H. Pedder
*Attorney, Agent, or Firm*—Baker & Daniels

[57] ABSTRACT

A converted passenger van has an aperture cut in a side body panel in which a bay window is installed. A shroud extends around the upper and forward edges of the aperture, and includes an active deflecting portion which extends outwardly from the side body panel and then inwardly over a portion of the window. The forward edge of the shroud deflects moisture entrained in the airstream created by the forward movement of the vehicle away from any discontinuities between the edge of the aperture and the frame holding the window, and the portion of the shroud extending along the upper edge of the aperture deflects water draining from the roof of the vehicle when the vehicle is parked away from any discontinuity between the upper edge of the window and the corresponding portion of the window frame.

11 Claims, 4 Drawing Sheets

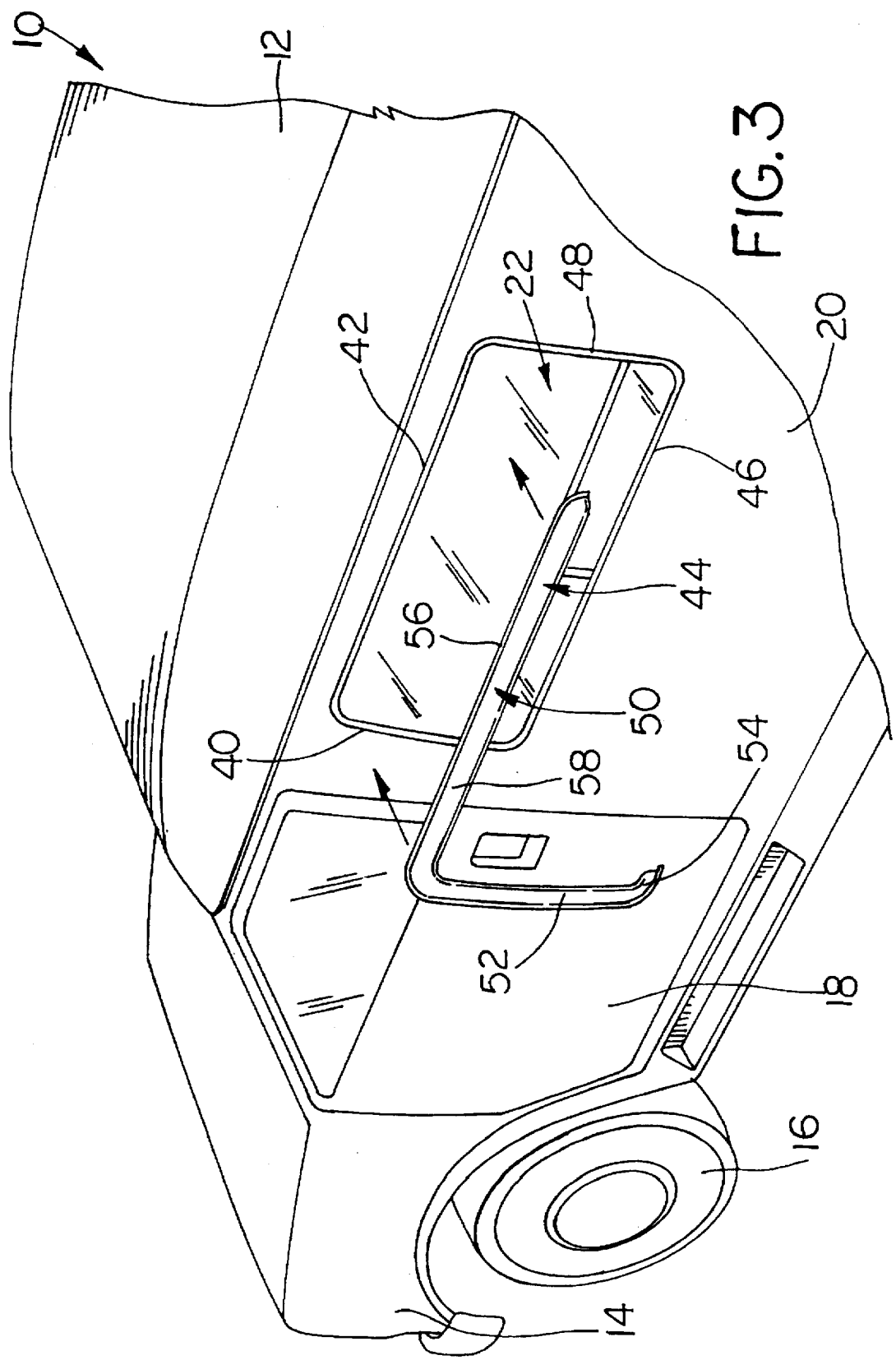

WINDOW SHROUD FOR PASSENGER VAN

This invention relates to an exterior window shroud for a bay window of a conversion passenger van.

Conversion vans have become increasingly popular with the motoring public. Conversion vans are converted from a stock vehicle by installing large vista bay windows in the side body panels of the vehicle, as well as making other decorative and functional changes. The bay windows are installed by cutting large openings in the side body panels of the vehicles and then installing the relatively large bay windows in the openings. Metal shears are used to cut the openings for the bay windows, and the cutting operation tends to stretch the metal to a degree that irregularities are caused that cannot be covered by normal window frames supplied with the bay window assemblies. Accordingly, the bay windows may have a tendency to leak around their edges. This is particularly so during forward motion of the vehicle, in which wind driven moisture is forced into any gap along the forward edge of the window. When the vehicle is parked, rain draining from the roof of the vehicle may also enter the vehicles through any irregularities in the top edge of the window. Furthermore, normal wind noise during forward motion of the vehicle is annoying; accordingly, it is desirable to deflect wind noise away from the windows of the vehicle. Still further, conversion vehicles are tall and boxy and often are not stylish or pleasing to the eye. Accordingly, it is desirable to soften the body lines, particularly on the side body of the panels and around the windows to create flowing lineal lines and to drop visual height connotation of the vehicle.

According to the present invention, a contoured window shroud extends around the forward and top edges of the large openings of the side body panels in which bay windows are installed. The shroud is mounted to the side body panel of the vehicle adjacent the forward and top edges of the bay windows, and includes an active deflecting portion which extends outwardly from the vehicle and inwardly with respect to the opening from a marginal portion that is secured to the side body panel, preferably by an adhesive. The active deflecting portion deflects wind noise away from the vehicle during forward movement thereof, and also deflects any moisture entrained in the airstream created by movement of the vehicle away from the window thus preventing entry of such moisture into the vehicle through any irregularities between the opening cut to accommodate the window and the window frame. The portion of the shroud extending along the upper edge of the window deflects moisture draining from the roof when the vehicle is parked, similarly protecting the upper edge of the window from moisture entry. The shroud is contoured to create a streamlined visual flowing lines, which enhance the overall styling of the vehicle and drop the visual height connotation of the vehicle by softening the body line around the window.

These and other advantages of the present invention become apparent from the following description, with reference to the accompanying drawings, in which:

FIG. 3 is a view similar to FIGS. 1 and 2 but illustrates the shroud of the present invention and the method in which it is applied to the vehicle;

Figure 4:
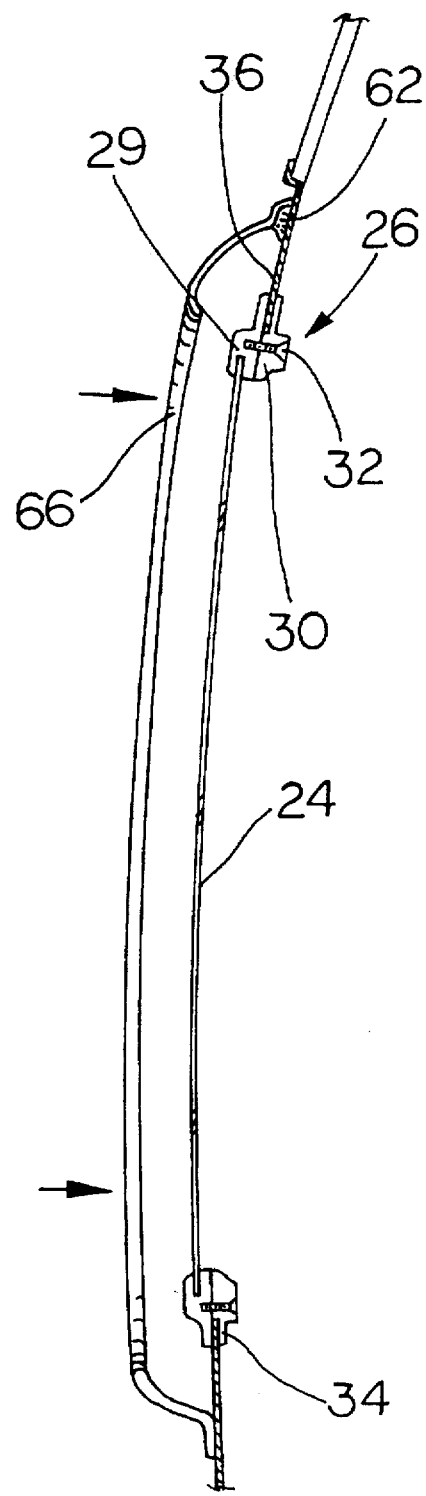
FIG. 4 is an enlarged cross-sectional view taken substantially along lines 4—4 of FIG. 1.

Referring now to the drawings, a passenger van indicated at 10 includes a roof 12, a front fender 14, a left front wheel 16, a left driver's door 18 and a side panel 20. The van 10 has been converted from a stock van by, among other things, the installation of an enlarged side vista bay window generally indicated by the numeral 22. The window 22 consists of a translucent panel 24 and a frame 26 circumscribing the translucent panel 24 to retain the latter in an aperture 28 cut in the body panel 20. As most clearly illustrated in FIG. 4, the frame 26 includes an outer frame member 29 which holds the translucent panel 24 and inner frame member 30 on the interior of the van 10 which is secured to the outer frame member 29 by fasteners 32. The frame members 29, 30 define a slot 34 which receives the marginal edge portion 36 of the body panel 20 which circumscribes the aperture 28.

Figure 1:
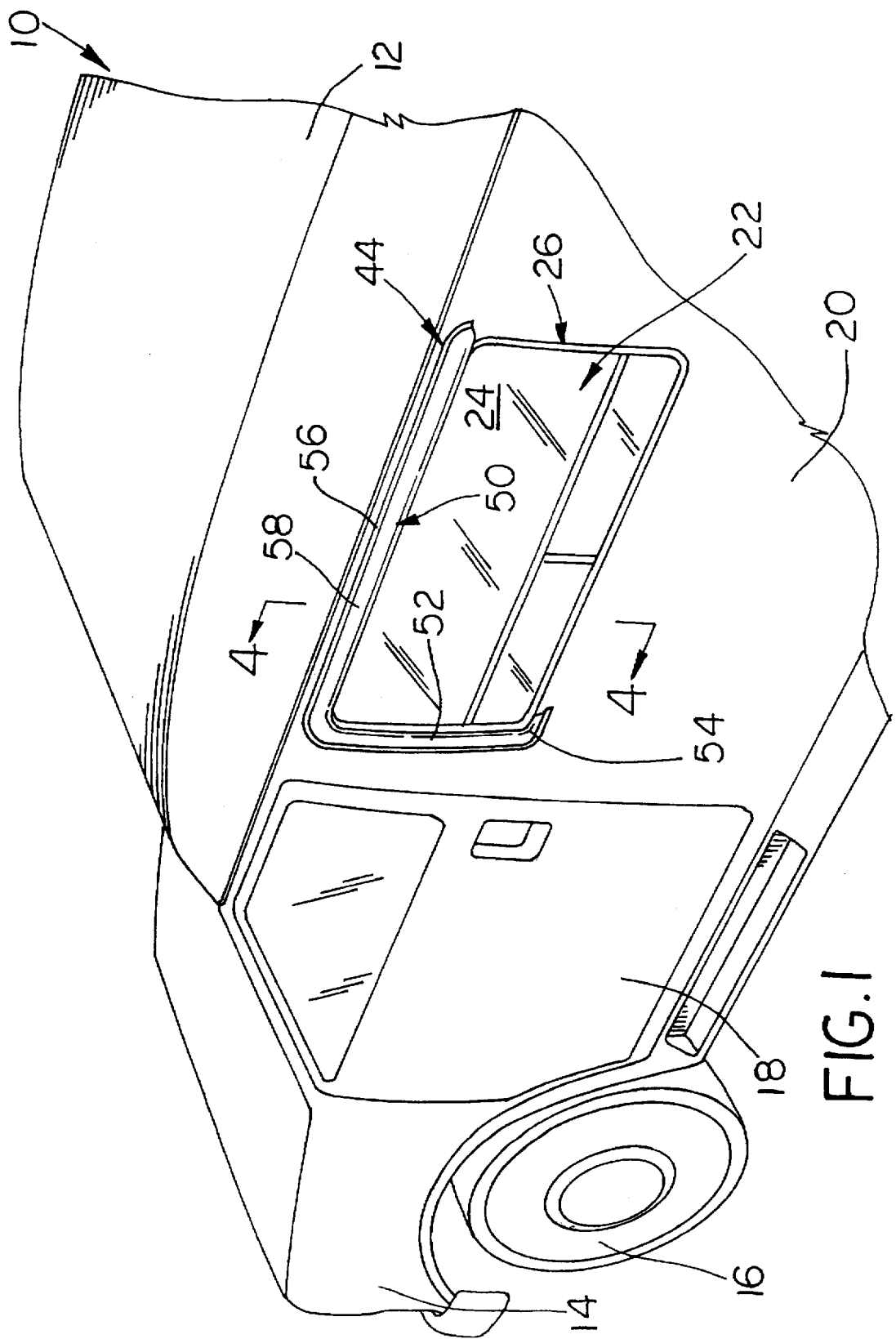
FIG. 1 is a fragmentary view in perspective of a passenger van including a bay window installed in the side body panel thereof along with a window shroud made pursuant to the teachings of the present invention.
Figure 2:
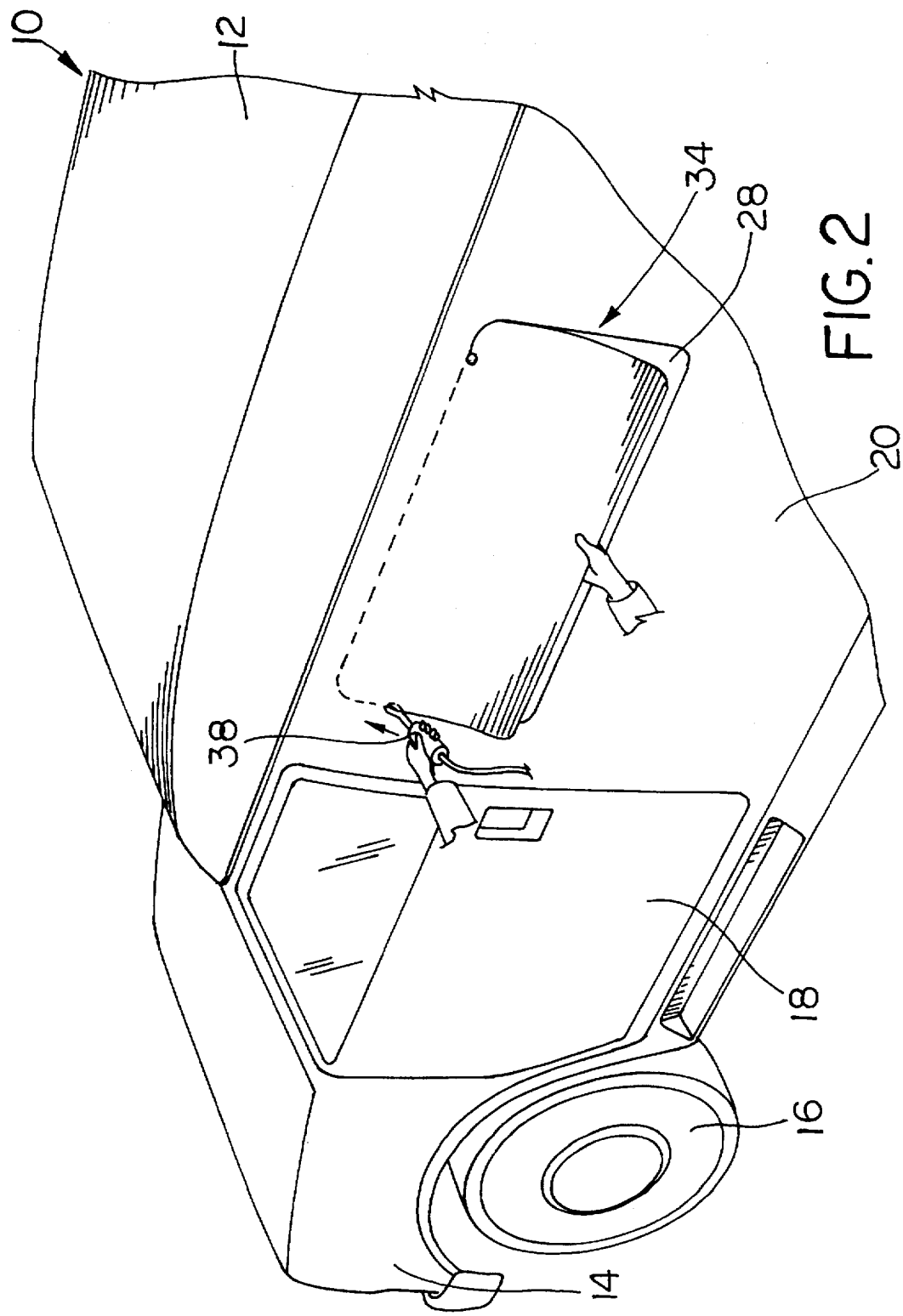
FIG. 2 is a view similar to FIG. 1 but illustrating the manner in which a portion of the side panel of the vehicle is removed for installation of the bay window before the shroud according to the present invention is applied thereto.

As illustrated in FIG. 2, the aperture 28 is cut in side panel 20 by manually held electrically or air operated metal shearers generally indicated by the numeral 38. Cutting of the aperture tends to stretch the sheet metal, which sometimes cannot be smoothly covered by the conventional window frame 26. Although any such discontinuity between the window frame and the vehicle body is usually small, any such discontinuity is a possible source of leaks into the interior of the van. This is particularly true along forward side 40 of the aperture 28, which defines the side of the aperture facing the front of the van, and along the upper side 42 the aperture 28 which extends parallel to the roof 12 of the van. In the case of the forward edge 40, the airstream formed around the vehicle during forward motion thereof tends to drive moisture into any discontinuities that may exist between the forward edge 40 and the frame 26. With respect to the upper edge 42, water draining from the roof 12 when the vehicle is parked tends to enter any discontinuity between the upper edge 42 and the frame 26. Accordingly, a shroud generally indicated by the numeral 44 extends along the upper edge 42 and forward edge 40 of the aperture 28 in which window 22 is mounted. Shroud 44 includes a portion 50 that extends along the upper edge 42 and a portion 52 that extends along the forward edge 40, with a short tail section 54 extending along a short segment of the lower edge 46.

Figure 5:
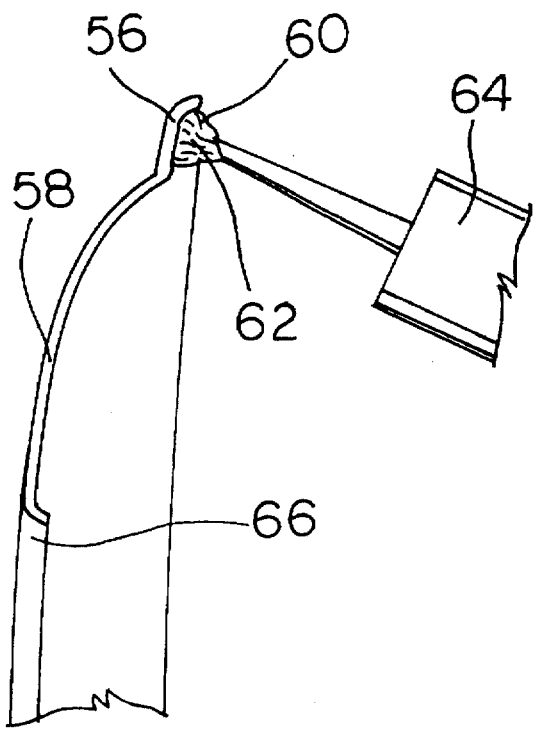
FIG. 5 is an enlarged view of the end portion of the shroud illustrated in FIG. 4 and illustrating the manner in which the adhesive is applied thereto to install the shroud on the vehicle.

As seen in FIG. 3, portions 50 and 52 of shroud 44 include an edge section 56 that is secured to a portion of the side panel 20 adjacent the edges 40 and 42 and an active deflecting portion 58 that extends outwardly from the end section 56 and inwardly with respect to the aperture 28. The edge section 56 defines a groove 60 in which a bead of adhesive 62 is dispensed by applicator 64 (FIG. 5). After the adhesive 62 is dispensed in the groove 60, the shroud is mounted on the vehicle as illustrated in FIG. 3. A double-faced adhesive tape, which extends from the groove in order to contact the body panel 20, may also be used. When properly installed on the vehicle, the active portion 58 extends over the frame 26 along the upper edge 42 and the forward edge 40 of the aperture 28 and downwardly over the translucent panel 24. A gap is defined between a lip 66 on the inward edge of the shroud 44 and the translucent panel 24.

The active portion 58 of shroud 44 is curved in the shape of an airfoil and thus deflects the airstream and associated noise created by forward movement of the vehicle away from the window 22, thus quieting the interior passenger compartment of the vehicle. The active portion 58 also deflects moisture entrained in the airstream due to forward motion of the vehicle away from any discontinuity between the forward edge 40 of the aperture and that portion of the frame 26 extending along the forward edge 40, thereby preventing moisture from entering into the passenger compartment of the vehicle through any such discontinuities. When the vehicle is parked, the active portion 58 along the section 50 of the shroud extending along the upper edge 42 of the aperture 28 deflects water draining from the roof 12 away from any discontinuities between the upper edge 42 and that portion of the frame 26 extending along the upper edge 42. Furthermore, the curved airfoil shape of the active portion 58 has a streamlining and lowering effect on the vehicle 10 and softens the body lines because of the flowing lineal lines of the shroud 44. The shroud 44 may be manufactured from any material well known to those skilled in the art and colored to either match or contrast with the color of the vehicle 10.

I claim:

1. In combination, a passenger van having a front and including a side body panel defining a substantially rectangular aperture, a window complimentarily fitted in said aperture, said window including a frame and a translucent panel carried by said frame, said frame including a substantially vertical forward side toward said front of said van, a horizontal upper side, a vertical rearward side opposite said vertical forward side, and a horizontal lower side opposite said horizontal upper side, said side body panel further including a marginal portion circumscribing said aperture, and a shroud, said shroud comprising:

a substantially horizontal upper portion mounted to said marginal portion along said horizontal upper side of said frame; and a substantially vertical forward portion mounted to said marginal portion along said vertical forward side of said frame, each of said horizontal upper portion and said vertical forward portion including an active deflecting portion having a smooth, continuous, outwardly bowed outer surface and extending from an edge section secured to said marginal portion outwardly relative to said side body panel and over said frame, said active deflecting portion of said vertical forward portion constituting means for deflecting the airstream resulting from forward movement of the vehicle along said side body panel, said active deflecting portion of said horizontal upper portion constituting means for deflecting moisture draining from the roof of the vehicle when the vehicle is stopped away from said window.

2. The combination as claimed in claim 1, wherein said shroud is secured to said marginal portion by an adhesive.

3. The combination as claimed in claim 1, wherein said edge section defines a groove extending around said shroud, said shroud being secured to said side body panel by an adhesive disposed in said groove.

4. The combination as claimed in claim 3 wherein each of said active deflecting portions cooperate with said window to define a gap therebetween.

5. The combination as claimed in claim 1 wherein said horizontal upper portion extends continuously along said horizontal upper side of said frame and said vertical forward portion extends continuously along said vertical forward side of said frame.

6. The combination as claimed in claim 1, wherein said active deflecting portion is curved into the shape of an airfoil.

7. The combination as claimed in claim 1 wherein said active deflecting portion of said horizontal upper portion extends over said horizontal upper side of said frame and said active deflecting portion of said vertical forward portion extends over said vertical forward side of said frame.

8. The combination of claim 1 wherein said shroud includes a horizontal lower portion extending from said vertical forward portion partially along said horizontal lower side of said frame.

9. The combination of claim 8 wherein said horizontal lower portion includes an edge section secured to said marginal portion of said side body panel.

10. The combination of claim 8 wherein said horizontal lower portion includes an active deflecting portion having a bowed outer surface.

11. The combination of claim 1 wherein each of said active deflecting portions include a terminating edge section opposite its said edge section secured to a said marginal portion, said terminating edge section being turned inwardly toward said window.

* * * * *